(12) United States Patent
Ratan et al.

(10) Patent No.: US 10,247,075 B2
(45) Date of Patent: Apr. 2, 2019

(54) SYSTEMS AND METHODS FOR REDUCING NOISE IN REDUCTANT INSERTION ASSEMBLIES

(71) Applicant: Cummins Emission Solutions Inc., Columbus, IN (US)

(72) Inventors: Santosh Kumar Ratan, Columbus, IN (US); Bryce R. Larson, Seymour, IN (US); Jinqian Gong, Columbus, IN (US); Abhijeet Singh Chauhan, Columbus, IN (US); Arun Kumar Dasari, Columbus, IN (US); Aditi Vedantam, Columbus, IN (US); Frederick V. Holt, III, Fishers, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 274 days.

(21) Appl. No.: 15/150,588

(22) Filed: May 10, 2016

(65) Prior Publication Data

US 2017/0328251 A1 Nov. 16, 2017

(51) Int. Cl.
- F01N 3/00 (2006.01)
- F01N 3/20 (2006.01)
- F01N 9/00 (2006.01)

(52) U.S. Cl.
CPC ............... F01N 3/208 (2013.01); F01N 9/00 (2013.01); *F01N 2610/02* (2013.01);
(Continued)

(58) Field of Classification Search
CPC ........ F01N 3/206; F01N 3/2066; F01N 3/208;
F01N 11/007; F01N 2570/14; F01N 2610/00; F01N 2610/02; F01N 2610/1406; F01N 2610/1426; F01N 2610/144; F01N 2610/1446; F01N 2610/146;
(Continued)

(56) References Cited

U.S. PATENT DOCUMENTS

| 6,195,985 | B1 * | 3/2001 | del Re | .................... B60K 6/46 60/274 |
| 6,269,633 | B1 * | 8/2001 | van Nieuwstadt | ...... F01N 3/208 60/277 |

(Continued)

*Primary Examiner* — Phutthiwat Wongwian
*Assistant Examiner* — Diem Tran
(74) *Attorney, Agent, or Firm* — Foley & Lardner LLP

(57) ABSTRACT

An aftertreatment system comprises an aftertreatment component structured to decompose constituents of an exhaust gas produced by an engine. A reductant insertion assembly is fluidly coupled to the aftertreatment component and configured to insert a reductant therein. A controller is operatively coupled to the reductant insertion assembly and configured to instruct the reductant insertion assembly to insert the reductant into the aftertreatment component for a first insertion time between first time intervals. The controller determines an operating condition of the engine, and determines if the operating condition satisfies a predetermined condition. In response to the predetermined condition being satisfied, the controller instructs the reductant insertion assembly to insert the reductant into the aftertreatment component for a second insertion time between second time intervals. The second insertion time is longer than the first insertion time.

15 Claims, 6 Drawing Sheets

(52) U.S. Cl.
  CPC ............... *F01N 2610/146* (2013.01); *F01N 2900/0418* (2013.01); *F01N 2900/0421* (2013.01); *F01N 2900/08* (2013.01); *F01N 2900/1812* (2013.01); *F01N 2900/1821* (2013.01)

(58) Field of Classification Search
  CPC ....... F01N 2610/148; F01N 2610/1493; F01N 2900/0402; F01N 2900/08; F01N 2900/1402; F01N 2550/05
  USPC ................................ 60/286, 295, 301, 303
  See application file for complete search history.

(56) References Cited

U.S. PATENT DOCUMENTS

| | | | | |
|---|---|---|---|---|
| 9,192,892 | B2* | 11/2015 | Nunez | F01N 3/208 |
| 2007/0122317 | A1* | 5/2007 | Driscoll | B01D 53/90 |
| | | | | 422/170 |
| 2015/0096287 | A1* | 4/2015 | Qi | F01N 3/208 |
| | | | | 60/286 |

* cited by examiner

SYSTEMS AND METHODS FOR REDUCING NOISE IN REDUCTANT INSERTION ASSEMBLIES

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidically communicated to the catalyst included in the SCR system to decompose substantially all of the NOx gases into relatively harmless byproducts that are expelled out of the aftertreatment system.

Aftertreatment systems generally comprise a reductant insertion assembly for inserting a reductant into the SCR system. The reductant insertion assembly may comprise a dosing valve (e.g., a dosing valve included in an injector or doser of the reductant insertion assembly). The dosing valve may produce an audible sound, for example a clicking sound, every time the dosing valve opens to insert the reductant into the SCR system of the aftertreatment system.

SUMMARY

Embodiments described herein relate generally to systems and methods for reducing noise produced by reductant insertion assemblies. Various embodiments described herein are related to systems and methods for increasing an insertion time of a reductant into an exhaust aftertreatment system fluidly coupled to an engine when the engine is operating at idle conditions so as to increase an insertion time of the reductant, thereby reducing noise, as well as preventing degradation in performance of the aftertreatment system because of under- or over-dosing due to longer insertion time of the reductant.

In a first set of embodiments, an aftertreatment system comprises an aftertreatment component structured to decompose constituents of an exhaust gas produced by an engine. A reductant insertion assembly is fluidly coupled to the aftertreatment component and configured to insert a reductant into the aftertreatment component. A controller is operatively coupled to the reductant insertion assembly. The controller is configured to instruct the reductant insertion assembly to insert the reductant into the aftertreatment component for a first insertion time between first time intervals. The controller determines an operating condition of the engine and determines if the operating condition satisfies a predetermined condition. In response to the predetermined condition being satisfied, the controller instructs the reductant insertion assembly to insert the reductant into the aftertreatment component for a second insertion time between second time intervals. The second insertion time is longer than the first insertion time.

In another set of embodiments, a method of reducing noise produced by a reductant insertion assembly of an aftertreatment system receiving exhaust gas from an engine comprises inserting a reductant into the aftertreatment component for a first insertion time between first time intervals. An operating condition of the engine is determined. It is determined if the operating condition satisfies a predetermined condition, the predetermined condition comprising at least one of a vehicle speed being less than a predetermined speed threshold, an engine speed being less than an engine speed threshold, an engine torque being less than an engine torque threshold, and an exhaust gas mass flow being less than an exhaust gas mass flow threshold. In response to the predetermined condition being satisfied, the reductant is inserted into the selective catalytic reduction system for a second insertion time between second time intervals. The second insertion time is longer than the first insertion time.

In yet another set of embodiments, a method for preventing degradation in a performance of an aftertreatment system due to increase in a time period for which a reductant is inserted into the aftertreatment system comprises inserting a reductant into the aftertreatment system for a first insertion time between first time intervals. A free-running counter is initiated in response to receiving a reductant insertion request. The free-running counter is reset after the first insertion time is complete. The first insertion time corresponds to a first volume of the reductant inserted into the aftertreatment system during a normal operation of an engine fluidly coupled to the aftertreatment system. If a predetermined condition of the engine is satisfied, a second volume of the reductant is inserted into the aftertreatment system in a second insertion time. The second insertion time is longer than the first insertion time. The first volume of the reductant is integrated using an integrator so as to determine an integrated volume. The first volume is integrated until the integrated volume is equal to or greater than a second volume corresponding to the second insertion time. The integrator is reset once the integrated volume is equal to or greater than the second volume. In response to the integrated volume being less than or equal to the second volume, insertion of the reductant into the aftertreatment system is stopped until the integrated volume is greater than the second volume.

In still another set of embodiments, a control circuitry for reducing noise generated by a reductant insertion assembly coupled to an aftertreatment system comprises a controller configured to be operatively coupled to the reductant insertion assembly. The controller comprises an insertion timing determination circuitry configured to instruct the reductant insertion assembly to insert the reductant into the aftertreatment component for a first insertion time between first time intervals. The controller also comprises an operating condition determination circuitry configured to determine an operating condition of an engine fluidly coupled to the aftertreatment system, and determine if the operating condition satisfies a predetermined condition. The predetermined condition comprises at least one of a vehicle speed being less than a predetermined speed threshold, an engine speed being less than an engine speed threshold, an engine torque being less than an engine torque threshold, and an exhaust gas mass flow being less than an exhaust gas mass flow threshold. The insertion timing determination circuitry is further configured to, in response to the predetermined condition being satisfied, instruct the reductant insertion assembly to insert the reductant into the aftertreatment component for a second insertion time between second time intervals. The second insertion time is longer than the first insertion time.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
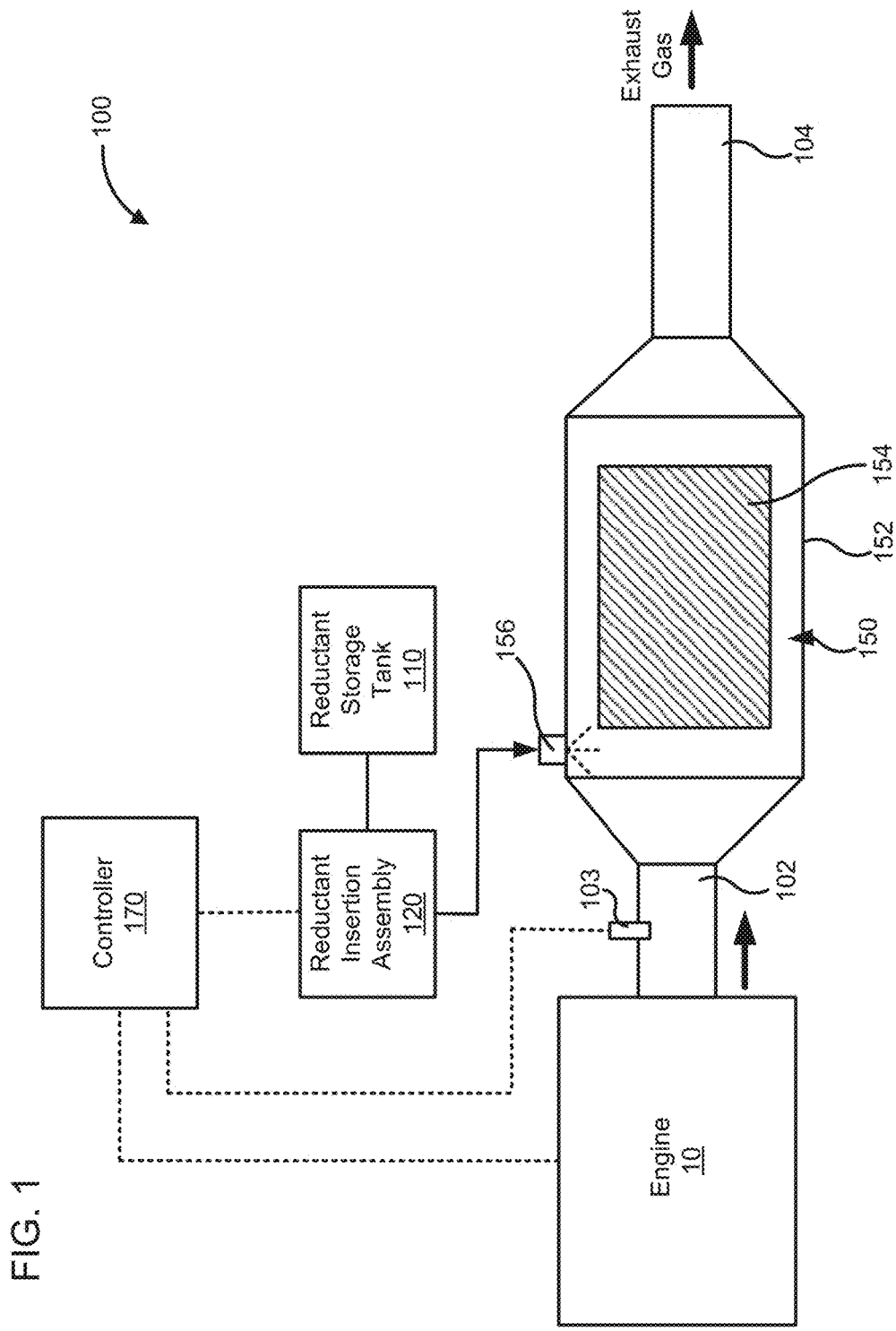
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for reducing noise produced by reductant insertion assemblies. Various embodiments described herein are related to systems and methods for increasing an insertion time of a reductant into an exhaust aftertreatment system fluidly coupled to an engine when the engine is operating at idle conditions so as to increase an insertion time of the reductant, thereby reducing noise, as well as preventing degradation in performance of the aftertreatment system because of under- or over-dosing due to longer insertion time of the reductant.

Aftertreatment systems generally comprise a reductant insertion assembly for inserting a reductant into the SCR system. The reductant insertion assembly may comprise a dosing valve (e.g., a dosing valve included in an injector or doser of the reductant insertion assembly). The dosing valve may produce an audible sound, for example a clicking sound, every time the dosing valve opens for inserting the reductant into the SCR system of the aftertreatment system.

The sound generated by the dosing valve is generally not a problem during normal operation of the engine, for example normal operation of a vehicle including the engine and the aftertreatment system. This is because the noise produced by the engine may be sufficient to suppress or drown out the noise produced by the dosing valve. However, during low noise operating conditions of the engine, for example when the engine is producing a noise below a predetermined noise threshold (e.g., during idling or idle operation of the engine), the sound produced by the dosing valve may become sufficiently audible so as to be heard above the engine noise.

Generally, reductant insertion assemblies are configured to insert the reductant for a fixed insertion time, for example 5 milliseconds, between variable time intervals based on a reductant demand by the aftertreatment system (e.g., by an SCR system of the aftertreatment system based on an engine operating condition). Since the frequency of reductant insertion via the dosing valve is generally pretty high, for example the fixed insertion time of 5 milliseconds between insertion time intervals of 5 milliseconds to 5 seconds, an operator or a user may hear a continuous clicking sound which may cause distractions and is generally unappealing to the user or operator.

Various embodiments of the systems and methods described herein may provide benefits including, for example: (1) increasing an insertion time of the reductant into the aftertreatment system from a first insertion time (e.g., 5 milliseconds) to a second insertion time longer than the first insertion time (e.g., 30 milliseconds) so as to reduce a noise produced by the reductant insertion assembly (e.g., a dosing valve or injector thereof); (2) increasing the insertion time selectively in response to a low noise operation of an engine (e.g., the engine producing a noise below a predetermined noise threshold) fluidly coupled to the aftertreatment system; and (3) determining and compensating for an error due to the insertion of a higher volume of the reductant into the aftertreatment system during the second insertion time relative to the first insertion time so as to prevent degradation in performance of the aftertreatment system (e.g., a decrease in catalytic conversion efficiency due to an increase in concentration of NOx gases included in the exhaust gas emitted because of under-dosing or over-dosing as result of increasing the insertion time of the reductant).

FIG. 1 is a schematic illustration of an aftertreatment system 100, according to an embodiment. The aftertreatment system 100 is configured to receive an exhaust gas (e.g., a diesel exhaust gas) from an engine 10 (e.g., a diesel engine, a dual fuel engine, etc.) and reduce constituents of the exhaust gas such as, for example, NOx gases, CO, hydrocarbons, etc. The aftertreatment system 100 may comprise a reductant storage tank 110, a reductant insertion assembly 120, an aftertreatment component 150, and a controller 170.

The aftertreatment system 100 comprises a housing 152 defining an internal volume within which at least one aftertreatment component 150 structured to decompose constituents of an exhaust flowing therethrough is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the aftertreatment component 150 comprises a SCR system. In other embodiments, the aftertreatment component 150 may comprise a selective catalytic reduction filter (SCRF) system, or any other aftertreatment component configured to decompose constituents of the exhaust gas (e.g., NOx gases such as such nitrous oxide, nitric oxide, nitrogen dioxide, etc.), flowing through the aftertreatment system in the presence of a reductant, as described herein.

Although FIG. 1 shows only the aftertreatment component 150 positioned within the internal volume defined by the housing 152, in other embodiments, a plurality of aftertreatment components may be positioned within the internal volume defined by the housing 152 in addition to or in place of the aftertreatment component 150. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

An inlet conduit 102 is fluidly coupled to an inlet of the housing 152 and structured to receive exhaust gas from an engine 10 (e.g., a diesel engine, a gasoline engine, a bio-diesel engine, a natural gas engine, a dual fuel engine, etc.) and to communicate the exhaust gas to an internal volume defined by the housing 152. Furthermore, an outlet conduit 104 may be coupled to an outlet of the housing 152 and structured to expel treated exhaust gas into the environment.

A first sensor 103 may be positioned in the inlet conduit 102. The first sensor 103 comprises a NOx sensor, for example a physical or virtual NOx sensor, configured to determine an amount of NOx gases included in the exhaust gas being emitted by the engine 10. In various embodiments, an oxygen sensor, a temperature sensor, a pressure sensor, or any other sensor may also be positioned in the inlet conduit 102 so as to determine one or more operational parameters of the exhaust gas flowing through the aftertreatment system 100. A second sensor 105 is positioned in the outlet conduit 104. The second sensor 105 may comprise a second NOx sensor configured to determine an amount of NOx gases expelled into the environment after passing through the aftertreatment component 150.

The aftertreatment component 150 comprises a catalyst 154 formulated to decompose constituents of an exhaust gas, for example NOx gases, flowing through the aftertreatment system 100. A reductant insertion port 156 may be provided on a sidewall of housing 152 and structured to allow insertion of a reductant therethrough into the internal volume defined by the housing 152. The reductant insertion port 156 may be positioned upstream of the catalyst 154 (e.g., to allow reductant to be inserted into the exhaust gas upstream of the catalyst 154) or over the catalyst 154 (e.g., to allow reductant to be inserted directly on the catalyst 154).

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water.

A reductant insertion assembly 120 is fluidly coupled to the reductant storage tank 110. The reductant insertion assembly 120 is configured to selectively insert the reductant into the aftertreatment component 150 or upstream thereof (e.g., into the inlet conduit 102) or a mixer (not shown) positioned upstream of the aftertreatment component 150. The reductant insertion assembly 120 may comprise various structures to facilitate receipt of the reductant from the reductant storage tank 110 and delivery to the aftertreatment component 150.

For example, the reductant insertion assembly 120 may comprise one or more pumps having filter screens (e.g., to prevent solid particles of the reductant or contaminants from flowing into the pump) and/or valves (e.g., check valves) positioned upstream thereof to receive reductant from the reductant storage tank 110. In some embodiments, the pump may comprise a diaphragm pump but any other suitable pump may be used such as, for example, a centrifugal pump, a suction pump, etc.

The pump may be configured to pressurize the reductant so as to provide the reductant to the aftertreatment component 150 at a predetermined pressure. Screens, check valves, pulsation dampers, or other structures may also be positioned downstream of the pump to provide the reductant to the aftertreatment component 150. In various embodiments, the reductant insertion assembly 120 may also comprise a bypass line structured to provide a return path of the reductant from the pump to the reductant storage tank 110.

A valve (e.g., an orifice valve) may be provided in the bypass line. The valve may be structured to allow the reductant to pass therethrough to the reductant storage tank 110 if an operating pressure of the reductant generated by the pump exceeds a predetermined pressure so as to prevent over pressurizing of the pump, the reductant delivery lines, or other components of the reductant insertion assembly 120. In some embodiments, the bypass line may be configured to allow the return of the reductant to the reductant storage tank 110 during purging of the reductant insertion assembly 120 (e.g., after the aftertreatment system 100 is shut off).

In various embodiments, the reductant insertion assembly 120 may also comprise a blending chamber structured to receive pressurized reductant from a metering valve at a controllable rate. The blending chamber may also be structured to receive air, or any other inert gas (e.g., nitrogen), for example from an air supply unit so as to deliver a combined flow of the air and the reductant to the SCR system 150 through the reductant insertion port 156. In various embodiments, a nozzle may be positioned in the reductant insertion port 156 and structured to deliver a stream or a jet of the reductant into the internal volume of the housing 152 so as to deliver the reductant to the catalyst 154 of the aftertreatment component 150.

In various embodiments, the reductant insertion assembly 120 may also comprise a dosing valve, for example positioned within a reductant delivery line for delivering the reductant from the reductant insertion assembly 120 to the SCR system 150. The dosing valve can comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR system 150 or upstream therefrom. Opening and/or closing of the dosing valve may produce an audible sound (e.g., a clicking sound).

The controller may comprise any suitable controller, for example the computing device 630. The controller 170 is operatively coupled to the reductant insertion assembly 120. The controller 170 is configured to instruct the reductant insertion assembly 120 to insert the reductant into the aftertreatment component 150 for a first insertion time between first time intervals. In particular embodiments, the first insertion time is 5 milliseconds and the first time interval is in the range of 5 milliseconds to 5 seconds.

The controller 170 is also configured to determine an operating condition of the engine 10. For example, the controller 170 may be operatively coupled to the engine 10 and configured to receive an engine operating signal corresponding to an operating condition of the engine 10. For example, the controller 170 may be configured to receive and interpret an engine operating condition signal from one or more sensors operatively coupled to the engine 10 or the aftertreatment system 100.

A combination of the signals generated by the one or more sensors may be indicative of the operating condition of the engine 10. Such signals may comprise a vehicle speed (e.g., a vehicle including the engine 10 and the aftertreatment system 100), an engine speed of the engine 10, an engine torque of the engine 10, an exhaust gas mass flow emitted by the engine 10, a temperature of the exhaust gas at an inlet of the aftertreatment system 100, and/or an ambient temperature. In various embodiments, the controller 170 may be configured to receive and interpret a first sensor signal from the first sensor 103 (e.g., a first NOx sensor) and/or a second sensor signal from the second sensor 105 (e.g., the second NOx sensor) so as to determine the operating condition of the engine 10.

For example, under normal operating condition of the engine 10 (e.g., during acceleration, deceleration, driving on a highway) the controller 170 may be configured to instruct the reductant insertion assembly 120 to insert the reductant for the first insertion time, for example 5 milliseconds between first time intervals (e.g., 5 milliseconds to 5 seconds inclusive). During the normal operating condition of the engine 10, the noise produced by the engine 10 and/or the vehicle comprising the engine 10 may be sufficient to suppress or drown out any noise produced by the reductant insertion assembly 120 during insertion of the reductant into the aftertreatment component 150, for example due to the opening and closing of the dosing valve of the reductant insertion assembly 120.

The controller 170 determines if the operating condition satisfies a predetermined condition. In response to the predetermined condition being satisfied, the controller 170 instructs the reductant insertion assembly 120 to insert the reductant into the aftertreatment component 150 (e.g., an SCR system) for a second insertion time between second time intervals. The second insertion time is longer than the first insertion time.

Expanding further, the controller 170 may determine that the engine 10 is operating under a low noise operating condition, for example a noise being produced by the engine 10 is below a predetermined noise threshold. In particular embodiments, the low noise operating condition may comprise the engine 10 idling or an idle operation of the engine 10. Under such conditions, a noise produced by the reductant insertion assembly 120 due to insertion of the reductant into or upstream of the aftertreatment component 150 (e.g., because of the dosing valve opening) may be above the predetermined noise threshold.

During the low noise operating condition of the engine 10, insertion of the reductant at the first insertion time (e.g., 5 milliseconds) between first time intervals (e.g., in the range of 5 milliseconds to 5 seconds, inclusive of all ranges and values therebetween) may produce a noise (e.g., an audible clicking noise) at intervals so as to be disturbing and/or distracting for a user or an operator of the engine 10, or a vehicle which comprises the engine 10.

Under such operating conditions, the controller 170 instructs the reductant insertion assembly 120 to insert the reductant for the longer second insertion time, thereby reducing the insertion frequency. Furthermore, the second time interval may also be longer than the first time interval, further extending the insertion frequency. The increasing the insertion frequency reduces the noise that is produced by the reductant insertion assembly 120 or at least reduces a number of audible noise signals (e.g., clicks) produced by the reductant insertion assembly 120 during a given time period, relative to the first insertion time. This may greatly increase the comfort level of the user or the operator.

In particular embodiments, the second insertion time may be in a range of 20 to 100 milliseconds. In one embodiment, the second insertion time is 30 milliseconds. The second time intervals may be in the range of 30-50 milliseconds, inclusive of all ranges and values therebetween. In some embodiments, the second insertion time may be varied (e.g., in the range of 20-100 milliseconds) based on the operating condition of the engine 10.

The controller 170 may determine that the predetermined condition is satisfied using any suitable parameters. For example, the predetermined condition of the engine 10 may comprise a vehicle speed being less than a predetermined speed threshold, an engine speed being less than an engine speed threshold, an engine torque being less than an engine torque threshold, and/or an exhaust gas mass flow being less than an exhaust gas mass flow threshold. If one or more of these parameters are satisfied, the controller 170 may determine that the engine 10 is operating under a low noise operating condition, for example idling.

In some embodiments, the predetermined condition of the engine 10 may also comprise a temperature of the exhaust gas at an inlet of the aftertreatment system 100 (e.g., an inlet of the aftertreatment component 150) being between a low temperature threshold and a high temperature threshold (e.g., between 200 to 600 degree Celsius) and an ambient temperature being above an ambient temperature threshold (e.g., 0 degrees Celsius). For example, if the exhaust gas at the inlet of the aftertreatment component 150 is below the low temperature threshold, this may correspond to a cold start of the engine 10. In such a scenario, the reductant may not be inserted at all until the temperature rises above the low temperature threshold, for example to prevent reductant deposit formation.

In contrast, when the exhaust gas temperature at the inlet of aftertreatment component 150 is above the high temperature threshold, this may correspond to the engine 10 accelerating, decelerating, or operating under a normal operating condition. Furthermore, the ambient temperature being lower than the ambient temperature threshold may correspond to a temperature at which extending the insertion time of the reductant may cause reductant deposits to form in portions of the reductant insertion assembly (e.g., the dosing valve, reductant lines, and/or the nozzle positioned in the reductant insertion port 156).

In particular embodiments, the controller 170 may also be configured to instruct the reductant insertion assembly 120 to insert the reductant into the aftertreatment component 150 for the first insertion time between first time intervals even if the predetermined condition is satisfied if a performance test and/or a diagnostic test is being run on the engine 10. For example, the performance test and/or the diagnostic test may be configured to determine a status, efficiency or performance of the engine 10 and/or the under normal operating conditions. Even though the tests may be performed under low noise operating condition of the engine 10 (e.g., idling conditions), the controller 170 may continue insertion of the reductant at the first insertion time between first time intervals so as to allow the engine 10 and/or the aftertreatment system 100 to continue to delivering the same performance expected of the engine 10 and/or aftertreatment system 100 under normal operating conditions. It is to be appreciated that the noise produced by the reductant insertion assembly 120 may not be a concern during such tests.

The insertion of the reductant into the aftertreatment component 150 for the second insertion time between second time intervals may provide a lower volume (i.e., under-dosing) or a higher volume (i.e., over-dosing) of the reductant to the aftertreatment component 150. This may alter the performance of the catalyst 154 included in the aftertreatment component 150. For, example the catalyst 154 may have to store a larger portion of ammonia for NOx reduction relative to when the reductant is inserted into the aftertreatment component for the first insertion time. This may lead to degradation in a catalytic conversion efficiency of the catalyst 154 (e.g., due to under- or over-dosing of the reductant into the aftertreatment component 150), which can cause an increase in an amount of NOx gases included in the exhaust gas emitted from the aftertreatment system 100.

In some embodiments, the controller 170 may be configured to prevent degradation of a performance of the aftertreatment system 100 (e.g., a catalytic conversion efficiency thereof) by determining and compensating for an error due to longer insertion time of the reductant into the aftertreatment component 150 of the aftertreatment system 100. In some embodiments, the controller 170 may further be configured to initiate a free-running counter in response to a receiving reductant insertion request. The reductant insertion request may be received during normal operation and low noise operation of the engine 10. The free-running counter may comprise an internal clock or timer (e.g., a digital clock or timer integrated into the controller 170).

The controller 170 resets the free-running counter after the first insertion time (e.g., 5 milliseconds) is complete. The first insertion time corresponds to a first volume of the reductant which is inserted into the aftertreatment component 150 during the first insertion time. For example, the reductant insertion assembly may be configured to insert reductant at a rate of 0.005 ml per second corresponding to a first volume of $0.025 \times 10^{-3}$ ml. If the predetermined condition is satisfied, the controller 170 integrates the first volume of the reductant using an integrator so as to determine an integrated volume. For example, the integrated volume may include the sum of the individual volumes of the reductant inserted into the aftertreatment component 150 during each first insertion time (e.g., each 5 millisecond time interval) over the total time that the free-running counter runs.

The first volume is integrated until the integrated volume is equal to or greater than a second volume corresponding to the second insertion time (e.g., 30 milliseconds). The second volume may be 10-11 times of the first volume delivered during the first insertion time (e.g., 0.25 ml or higher). The controller 170 resets the integrator once the integrated volume is equal to or greater than the second volume. Furthermore, in response to the integrated volume being less than or equal to the second volume, the controller 170 instructs the reductant insertion assembly 120 to stop insertion of the reductant until the integrated volume is greater than the second volume. In this manner, the controller 170 may compensate for any under-dosing or over-dosing of the reductant into the aftertreatment component 150 so as to prevent any degradation in performance (e.g., a catalytic conversion efficiency) of the aftertreatment component 150.

Figure 2:
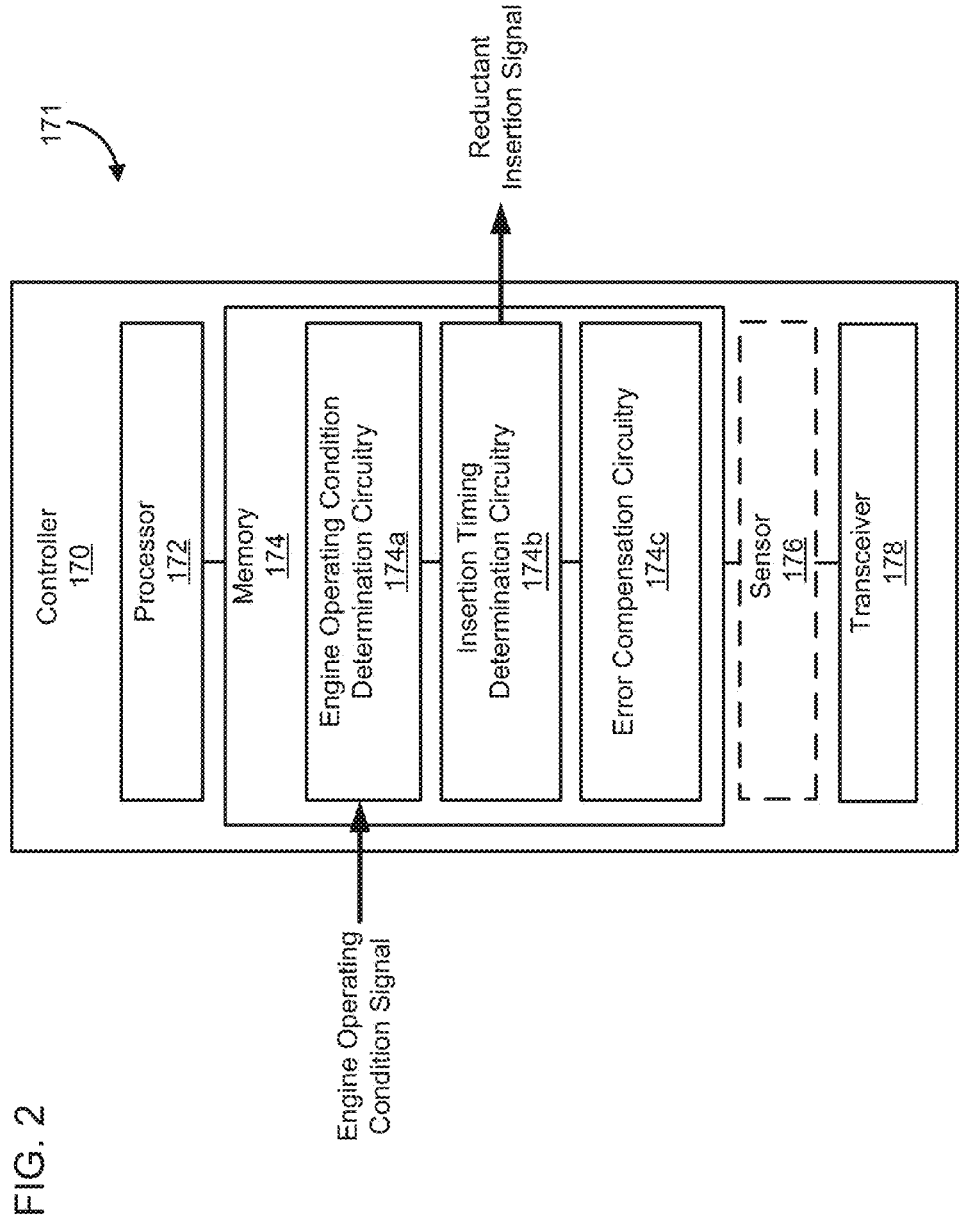
FIG. 2 is a schematic block diagram of an embodiment of a control circuitry that may be included in the aftertreatment system of FIG. 1.

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174, or any other computer readable medium, a transceiver 178, and a sensor 176. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

For example, the memory 174 may comprise an insertion timing determination circuitry 174b configured to instruct the reductant insertion assembly 120 (e.g., via a reductant insertion signal provide by the controller 170 to the reductant insertion assembly 120 via the transceiver 178) to insert the reductant into the aftertreatment component 150 for a first insertion time between first time intervals, as described herein.

The memory 174 also comprises an operating condition determination circuitry 174a configured to determine an operating condition of an engine 10 fluidly coupled to the aftertreatment system 100. For example the controller 170 may receive an engine operating condition signal from the engine 10 (e.g., via the sensor 176), for example generated by one or more sensors operatively coupled to engine 10, the first sensor 103, and/or the second sensor 105, that is indicative of the operating condition of the engine 10. Each of the various signals may comprise, for example, a current or a voltage. The operating condition determination circuitry 174a may comprise algorithms and/or look-up tables configured to interpret the engine operating condition signal so as to determine the operating condition of the engine 10.

The operating condition determination circuitry 174a determines if the operating condition satisfies a predetermined condition, for example whether the noise produced by the engine 10 is below the predetermined noise threshold (e.g., during an idle operation of the engine 10). The predetermined condition may be satisfied, for example, if a vehicle speed is less than a predetermined speed threshold, an engine speed is less than an engine speed threshold, an engine torque is less than an engine torque threshold, and/or and an exhaust gas mass flow is less than an exhaust gas mass flow threshold.

In some embodiments, satisfying the predetermined condition may also comprise a temperature of the exhaust gas at an inlet of the aftertreatment system being between a low temperature threshold and a high temperature threshold and an ambient temperature being above an ambient temperature threshold, as described in detail herein.

The insertion timing determination circuitry 174b is configured to, in response to the predetermined condition being satisfied, instruct the reductant insertion assembly 120 to insert the reductant into the aftertreatment component 150 for a second insertion time between second time intervals, the second insertion time being longer than the first insertion time. For example, the insertion timing determination circuitry 174b may extend the first insertion time (e.g., 5 milliseconds) between the first insertion intervals (e.g., in the range of 5 milliseconds 5 seconds inclusive) to the second insertion time (e.g., 30 milliseconds) between the second insertion intervals (e.g. in the range of 30-50 milliseconds).

In some embodiments, the insertion timing determination circuitry 174b may also be configured to instruct the reductant insertion assembly 120 to insert the reductant into the aftertreatment component 150 for the first insertion time between first time intervals even if the predetermined condition is satisfied. This may be the case when a performance test and/or a diagnostic test is being run on the engine 10, as previously described herein.

In some embodiments, the controller 170 also comprises an error determination circuitry 174c configured to prevent degradation in performance (e.g., catalytic conversion efficiency) of the aftertreatment component 150 of the aftertreatment system 100 because of an increase in insertion time of a reductant into the aftertreatment component 150. The error determination circuitry 174c is configured to initiate a free-running counter in response to receiving a reductant insertion request. The free-running counter is reset after the first insertion time is complete. The first running time corresponds to a first volume of the reductant.

If the predetermined condition is satisfied, as previously described, the error determination circuitry 174c integrates the first volume of the reductant using an integrator so as to determine an integrated volume. The first volume is integrated until the integrated volume is equal to or greater than a second volume corresponding to the second insertion time. The error determination circuitry 174c resets the integrator once the integrated volume is equal to or greater than the second volume.

The insertion timing determination circuitry 174b is further configured to, in response to the integrated volume being less than or equal to the second volume, instruct the reductant insertion assembly 120 to stop insertion of the reductant until the integrated volume is greater than the second volume, thereby compensating for any under-dosing or over-dosing of the reductant.

Figure 3:
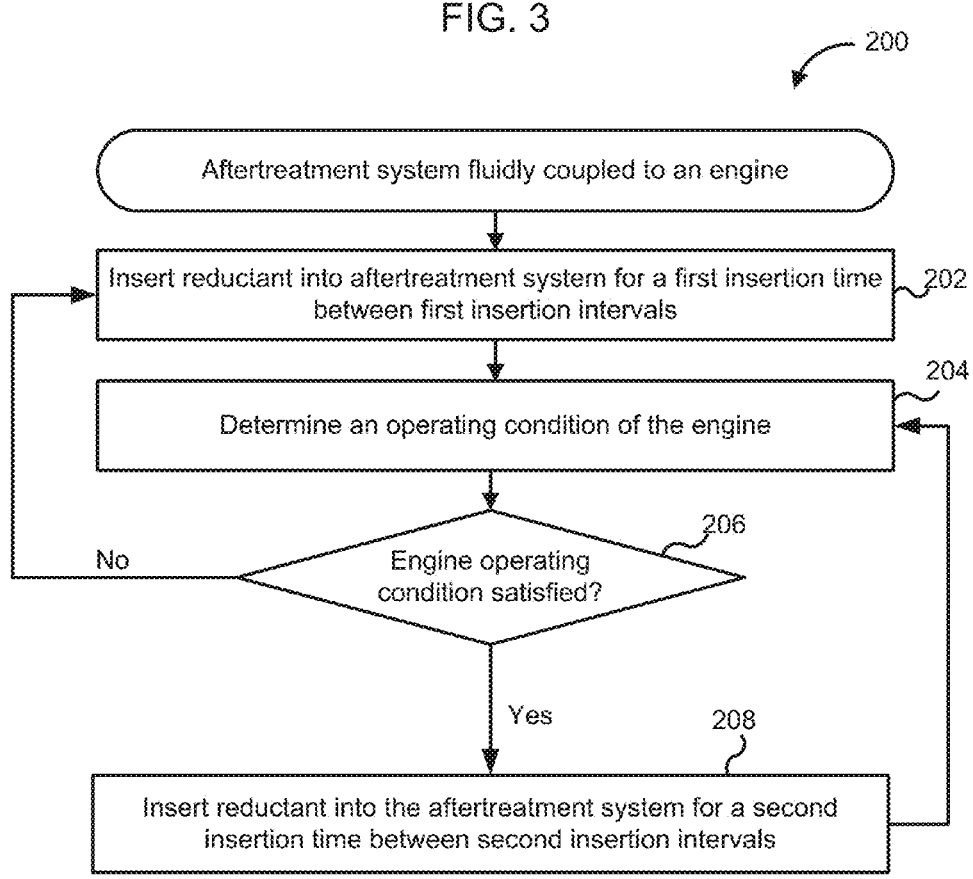
FIG. 3 is a schematic flow diagram of an example method for reducing noise produced by a reductant insertion assembly during a low noise operation of an engine.

FIG. 3 is a schematic flow diagram of an example method 200 for reducing noise produced by a reductant insertion assembly (e.g., the reductant insertion assembly 120) of an aftertreatment system (e.g., the aftertreatment system 100) receiving exhaust gas from an engine (e.g., the engine 10). The method 200 comprises inserting a reductant into the aftertreatment system for a first insertion time between first time intervals at 202. For example, the reductant insertion assembly 120 inserts the reductant into the aftertreatment component 150 of the aftertreatment system 100 for the first insertion time (e.g., 5 milliseconds) between first time intervals (e.g., 5 milliseconds to 5 seconds inclusive of all ranges and values therebetween).

An operating condition of the engine is determined at 204. It is determined if the operating condition satisfies a predetermined condition at 206. For example, the controller 170 may determine the operating condition of the engine 10, as previously described herein. The controller 170 then determines whether the operating condition satisfies the predetermined condition which may correspond to the engine 10 producing a noise below a predetermined noise threshold, for example during an idle operation of the engine 10.

The predetermined condition may comprise at least one of: a vehicle speed being less than a predetermined speed threshold, an engine speed being less than an engine speed threshold, an engine torque being less than an engine torque threshold, and/or an exhaust gas mass flow being less than an exhaust gas mass flow threshold. In some embodiments, the predetermined condition comprises at least one of: a temperature of the exhaust gas at an inlet of the aftertreatment system being between a low temperature threshold and a high temperature threshold and an ambient temperature being above an ambient temperature threshold.

If the predetermined condition is not satisfied, the method 200 returns to operation 202. In some embodiments, if the predetermined condition is satisfied, it is determined if at least one of a performance test and a diagnostic test is being run on the engine at 208. If the performance test or diagnostic test is running on the engine, the method 200 returns to operation 202. For example, the controller 170 continues to insert the reductant for the first insertion time between first insertion intervals if the performance test and/or diagnostic test is running on the engine 10.

In response to the predetermined condition being satisfied, the reductant is inserted into the aftertreatment system for a second insertion time between second time intervals at 208. The second insertion time is longer than the first insertion time. For example, in response to the predetermined condition being satisfied, the controller 170 instructs the reductant insertion assembly 120 to insert the reductant into the aftertreatment component 150 of the aftertreatment system 100 at the second insertion time (e.g., 30 milliseconds) between second insertion intervals (e.g., 30-50 milliseconds inclusive of all ranges and values therebetween). The method 200 may periodically check to determine if the predetermined condition continues to be satisfied, for example after predetermined intervals. The method 200 may return to operation 202 once the predetermined condition fails to be satisfied.

Figure 4:
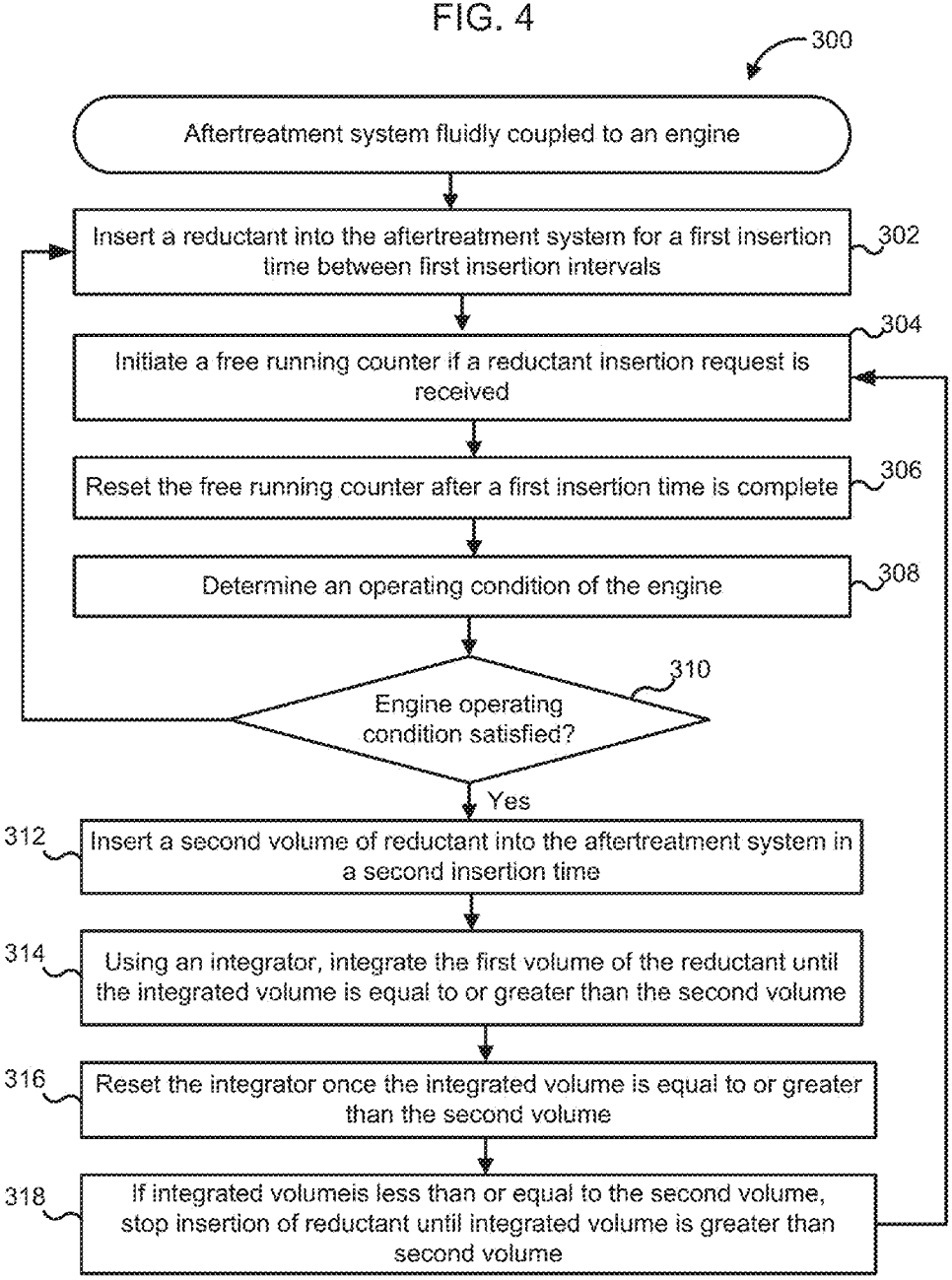
FIG. 4 is a schematic flow diagram of another method for preventing degradation in performance of an aftertreatment system because of increase in an insertion time of a reductant into the aftertreatment system.

FIG. 4 is a schematic flow diagram of another method 300 for preventing degradation in a performance of an aftertreatment system (e.g. the aftertreatment system 100) due to increase in a time period for which a reductant is inserted into the aftertreatment system. The method 300 may be a standalone method or may be used in any suitable combination with the method 200 or any other method described herein.

The method 300 comprises inserting a reductant into the aftertreatment system for a first insertion time between first time intervals at 302. For example, the controller 170 instructs the reductant insertion assembly 120 to insert the reductant for the first insertion time (e.g., 5 milliseconds) between the first insertion intervals (e.g., 5 milliseconds to 5 seconds inclusive of all ranges and values therebetween).

A free-running counter is initiated in response to receiving a reductant insertion request at 304. For example, the controller 170 initiates the free-running counter on receiving the reductant insertion request, for example from the aftertreatment component 150. The free-running counter is reset after a first insertion time is complete at 306. The first insertion time (e.g., 5 milliseconds) corresponds to a first volume of the reductant inserted into the aftertreatment system (e.g., the aftertreatment system 100) during a normal operation of an engine (e.g., the engine 10) fluidly coupled to the aftertreatment system.

An operating condition of the engine is determined at 308. It is determined whether a predetermined condition of the engine is satisfied at 310 (e.g., one or more of the predetermined conditions as previously described in detail herein). For example, the controller 170 determines the operating condition of the engine 10 and whether the predetermined condition is satisfied as described herein. If the predetermined condition is not satisfied, the method 300 returns to operation 302.

In response to determining that the predetermined condition is satisfied, a second volume of the reductant is inserted into the aftertreatment system in a second insertion time at 312. The second insertion time is longer than the first insertion time. For example, if the controller determines that the predetermined condition is satisfied, the controller 170 instructs the reductant insertion assembly 120 to insert the reductant for the second insertion time (e.g., 30 milliseconds) into the aftertreatment system.

The first volume of the reductant is integrated using an integrator so as to determine an integrated volume at 314. The first volume is integrated until the integrated volume is equal to or greater than a second volume corresponding to the second insertion time. The integrator is reset once the integrated volume is equal to or greater than the second volume at 316. For example, the controller 170 comprises an integrator which integrates the first volume so as to determine the integrated volume, as described herein. The controller 170 then resets the integrator once the integrated volume is equal to or greater than the second volume.

In response to the integrated volume being less than or equal to the second volume, insertion of the reductant into the aftertreatment system is stopped until the integrated volume is greater than the second volume at 316. For example, the controller 170 instructs the reductant insertion assembly 120 to stop insertion of the reductant into the aftertreatment component 150 until the integrated volume is greater than the second volume.

Figure 5:
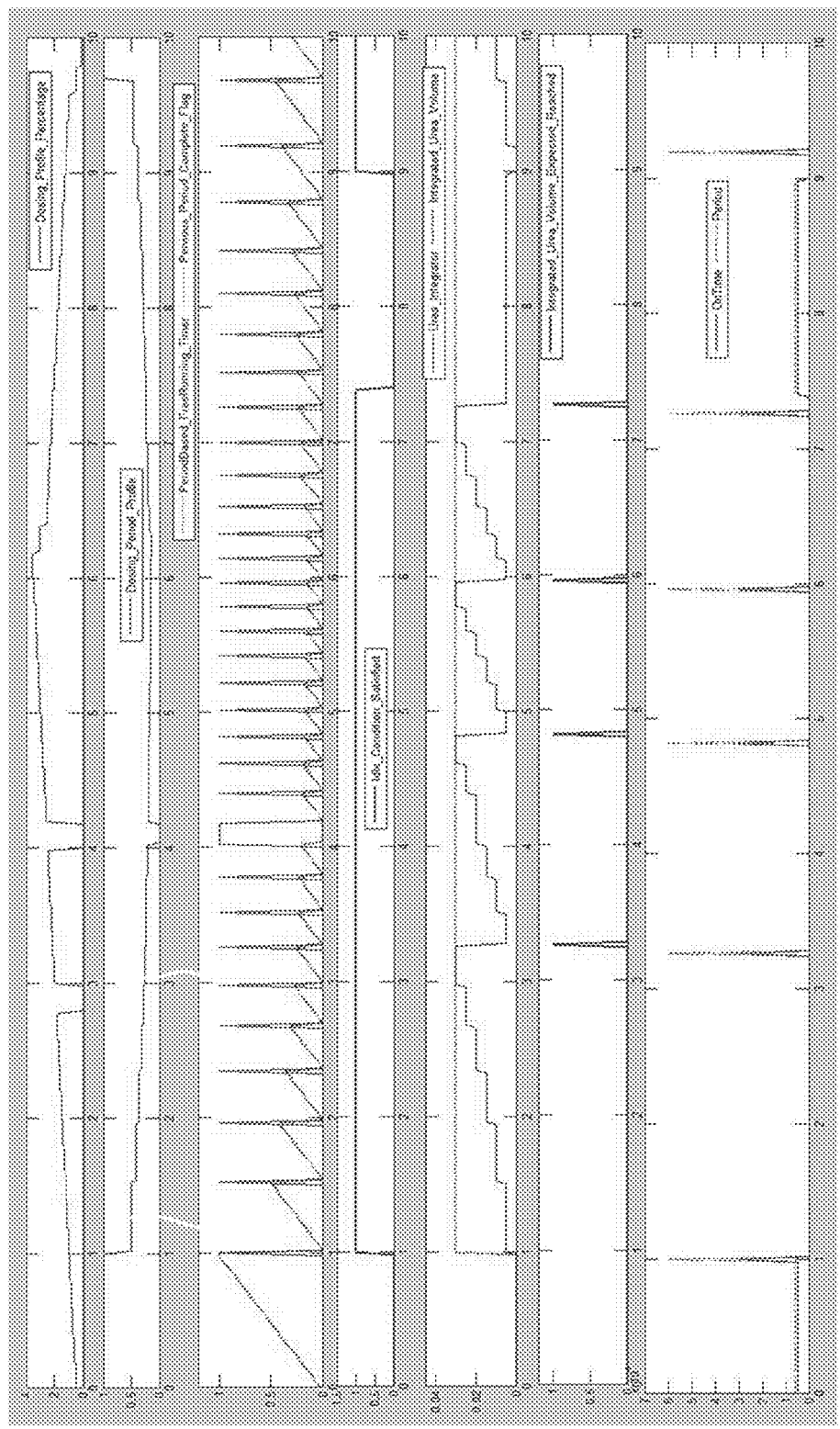
FIG. 5 comprises plots of the free-running counter and integrator for compensating for error due to increase in insertion time of the reductant inserted into the aftertreatment component of the aftertreatment system.

FIG. 5 are plots of the free-running counter and integrator preventing degradation in a performance of an aftertreatment system by compensating for error due to an increase in insertion time of the reductant inserted into the aftertreatment component of an example aftertreatment system. Once the idle condition is satisfied, the reductant is inserted for the second insertion time into the aftertreatment system. The free-running counter time is the shortest when the reductant dosing profile percentage is highest, and the integrator corresponds therewith. As can be seen in the bottom plot, the interval for the ON time (i.e., the second insertion time for which reductant is inserted into the aftertreatment system) is increased based on the second volume and the integrated volume as described herein.

Figure 6:
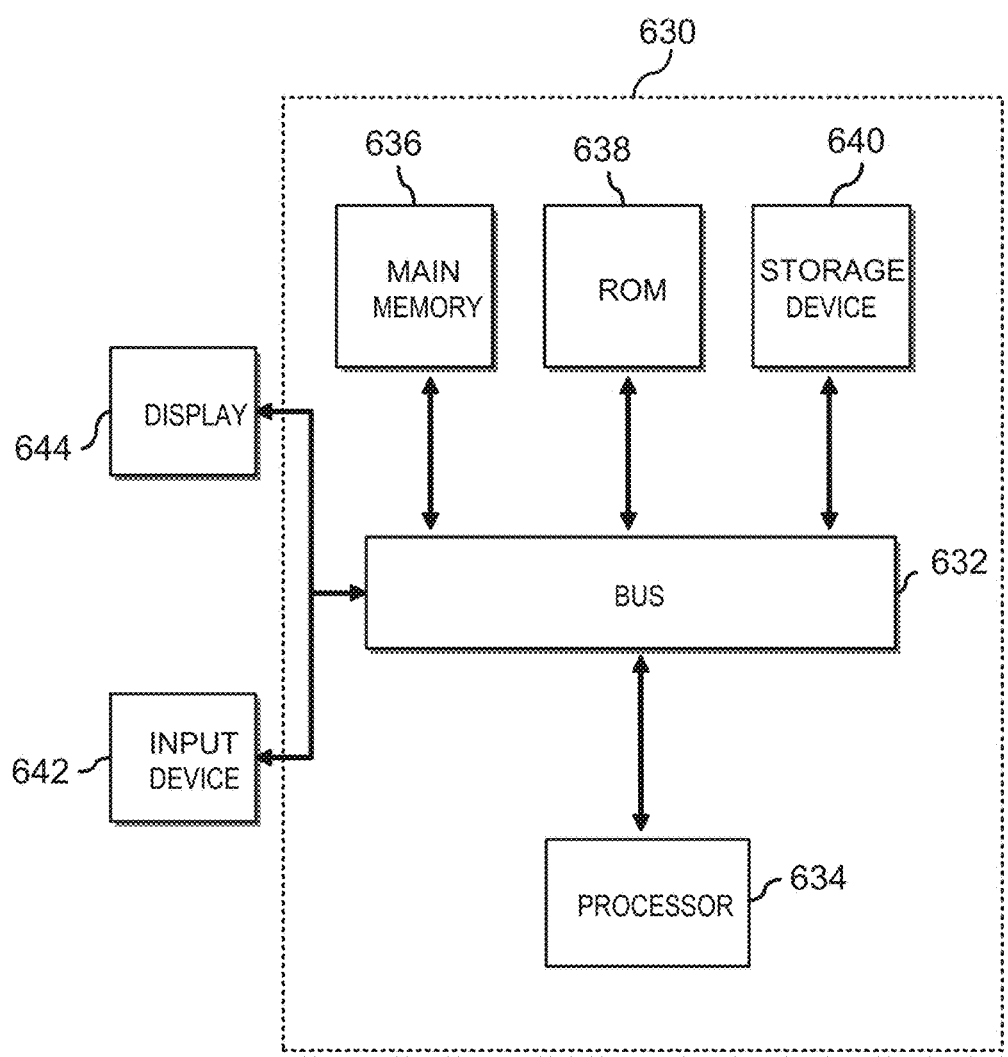
FIG. 6 is a schematic block diagram of a computing device which may be used as the controller shown in FIGS. 1 and/or 2.

In some embodiments, the controller 170, the control circuitry 171, or any of the controller or control circuitries described herein can comprise a system computer of an apparatus or system which comprises the aftertreatment system 100 (e.g., a vehicle, an engine or generator set, etc.). For example, FIG. 6 is a block diagram of a computing device 630 in accordance with an illustrative implementation. The computing device 630 can be used to perform any of the methods or the processes described herein, for example the method 200/300. In some embodiments, the controller 170 can comprise the computing device 630. The computing device 630 comprise a bus 632 or other communication component for communicating information. The computing device 630 can also comprise one or more processors 634 or processing circuits coupled to the bus 632 for processing information.

The computing device 630 also comprises main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further comprise ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding operations of the method 200 or 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 200/300). Such instructions can be read into main memory 636 from another non-transitory computer-readable medium, such as the storage device 640. Execution of the arrangement of instructions contained in main memory 636 causes the computing device 630 to perform the illustrative processes described herein.

One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 6, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
   an aftertreatment component structured to decompose constituents of an exhaust gas produced by an engine;
   a reductant insertion assembly fluidly coupled to the aftertreatment component and configured to insert a reductant into the aftertreatment component; and
   a controller operatively coupled to the reductant insertion assembly, the controller configured to:
      determine if the engine is operating in a low noise operating condition, wherein the low noise operating condition comprises an idling operation of the engine;
      when the engine is not operating in the low noise operating condition, instruct the reductant insertion assembly to insert the reductant into the aftertreatment component for a first insertion time between first time intervals; and
      when the engine is operating in the low noise operating condition, instruct the reductant insertion assembly to insert the reductant into the aftertreatment component for a second insertion time between second time intervals, the second insertion time longer than the first insertion time.

2. The aftertreatment system of claim 1, wherein the controller is configured to determine that the engine is operating in the low noise operating condition based upon a vehicle speed being less than a predetermined speed threshold.

3. The aftertreatment system of claim 1, wherein the controller is configured to determine that the engine is operating in the low noise operating condition based upon an engine speed being less than an engine speed threshold.

4. The aftertreatment system of claim 1, wherein the controller is configured to determine that the engine is operating in the low noise operating condition based upon an engine torque being less than an engine torque threshold.

5. The aftertreatment system of claim 1, wherein the controller is configured to determine that the engine is operating in the low noise operating condition based upon an exhaust gas mass flow being less than an exhaust gas mass flow threshold.

6. The aftertreatment system of claim 1, wherein the controller is further configured to:
   instruct the reductant insertion assembly to insert the reductant into the aftertreatment component for the first insertion time between the first time intervals even if the low noise operating condition is satisfied, if at least one of a performance test and a diagnostic test is being run on the engine.

7. The aftertreatment system of claim 1, wherein the first insertion time is 5 milliseconds and the second insertion time is 30 milliseconds.

8. The aftertreatment system of claim 7, wherein the first time intervals are in a range of 5 milliseconds to 5 seconds inclusive, and the second time intervals are in a range of 30 milliseconds to 50 milliseconds inclusive.

9. The aftertreatment system of claim 1, wherein the controller is further configured to:
   initiate a free-running counter in response to receiving a reductant insertion request;
   reset the free-running counter after the first insertion time is complete, the first insertion time corresponding to a first volume of the reductant;
   if the low noise operating condition is satisfied, integrate the first volume of the reductant using an integrator so as to determine an integrated volume, the first volume integrated until the integrated volume is equal to or greater than a second volume corresponding to the second insertion time;
   reset the integrator once the integrated volume is equal to or greater than the second volume; and
   in response to the integrated volume being less than or equal to the second volume, instruct the reductant insertion assembly to stop insertion of the reductant until the integrated volume is greater than the second volume.

10. An aftertreatment system comprising:
    an aftertreatment component structured to decompose constituents of an exhaust gas produced by an engine;
    a reductant insertion assembly fluidly coupled to the aftertreatment component and configured to insert a reductant into the aftertreatment component; and
    a controller operatively coupled to the reductant insertion assembly, the controller configured to:
       determine if a temperature of the exhaust gas at an inlet of the aftertreatment component is between a low temperature threshold and a high temperature threshold;
       when the temperature of the exhaust gas at the inlet of the aftertreatment component is above the high temperature threshold, instruct the reductant insertion assembly to insert the reductant into the aftertreatment component for a first insertion time between first time intervals;
       when the temperature of the exhaust gas at the inlet of the aftertreatment component is between the low temperature threshold and the high temperature threshold, instruct the reductant insertion assembly to insert the reductant into the aftertreatment component for a second insertion time between second time intervals, the second insertion time longer than the first insertion time; and
       when the temperature of the exhaust gas at the inlet of the aftertreatment component is below the low temperature threshold, instruct the reductant insertion assembly to stop inserting the reductant into the aftertreatment component.

11. A control circuitry for reducing noise generated by a reductant insertion assembly of an aftertreatment system, comprising:
    a controller configured to be operatively coupled to the reductant insertion assembly, the controller comprising:
       an operating condition determination circuitry configured to:

determine if an engine fluidly coupled to the aftertreatment system is operating in a low noise operating condition, wherein the low noise operating condition comprises an idling operation of the engine; and an insertion timing determination circuitry configured to:

instruct the reductant insertion assembly to insert the reductant into the aftertreatment system for a first insertion time between first time intervals when the engine is not operating in the low noise operating condition; and instruct the reductant insertion assembly to insert the reductant into the aftertreatment system for a second insertion time between second time intervals, the second insertion time longer than the first insertion time when the engine is operating in a low noise operating condition.

12. The control circuitry of claim 11, wherein the insertion timing determination circuitry is further configured to instruct the reductant insertion assembly to insert the reductant into the aftertreatment system for the first insertion time between the first time intervals even if the low noise operating condition is satisfied, if at least one of a performance test and a diagnostic test is being run on the engine.

13. The control circuitry of claim 11, wherein the controller further comprises an error compensation circuitry, the error compensation circuitry configured to:

initiate a free-running counter in response to receiving a reductant insertion request;

reset the free-running counter after the first insertion time is complete, the first insertion time corresponding to a first volume of the reductant;

if the low noise operating condition is satisfied, integrate the first volume of the reductant using an integrator so as to determine an integrated volume, the first volume integrated until the integrated volume is equal to or greater than a second volume corresponding to the second insertion time;

reset the integrator once the integrated volume is equal to or greater than the second volume; and wherein the insertion timing determination circuitry is further configured to, in response to the integrated volume being less than or equal to the second volume, instruct the reductant insertion assembly to stop insertion of the reductant until the integrated volume is greater than the second volume.

14. An aftertreatment system, comprising:

an aftertreatment component structured to decompose constituents of an exhaust gas produced by an engine;

a reductant insertion assembly fluidly coupled to the aftertreatment component and configured to insert a reductant into the aftertreatment component; and a controller operatively coupled to the reductant insertion assembly, the controller configured to:

instruct the reductant insertion assembly to insert the reductant into the aftertreatment component for a first insertion time between first time intervals;

determine an operating condition of the engine;

determine if the operating condition satisfies a predetermined condition; and in response to the predetermined condition being satisfied, instruct the reductant insertion assembly to insert the reductant into the aftertreatment component for a second insertion time between second time intervals, the second insertion time longer than the first insertion time, and instruct the reductant insertion assembly to insert the reductant into the aftertreatment component for the first insertion time between first time intervals even if the predetermined condition is satisfied, if at least one of a performance test and a diagnostic test is being run on the engine.

15. An aftertreatment system, comprising:

an aftertreatment component structured to decompose constituents of an exhaust gas produced by an engine;

a reductant insertion assembly fluidly coupled to the aftertreatment component and configured to insert a reductant into the aftertreatment component; and a controller operatively coupled to the reductant insertion assembly, the controller configured to:

instruct the reductant insertion assembly to insert the reductant into the aftertreatment component for a first insertion time between first time intervals;

initiate a free-running counter in response to receiving a reductant insertion request;

reset the free-running counter after the first insertion time is complete, the first insertion time corresponding to a first volume of the reductant;

determine an operating condition of the engine;

determine if the operating condition satisfies a predetermined condition;

in response to the predetermined condition being satisfied, instruct the reductant insertion assembly to insert the reductant into the aftertreatment component for a second insertion time between second time intervals, the second insertion time longer than the first insertion time;

in response to the predetermined condition being satisfied, integrate the first volume of the reductant using an integrator so as to determine an integrated volume, the first volume integrated until the integrated volume is equal to or greater than a second volume corresponding to the second insertion time;

reset the integrator once the integrated volume is equal to or greater than the second volume; and in response to the integrated volume being less than or equal to the second volume, instruct the reductant insertion assembly to stop insertion of the reductant until the integrated volume is greater than the second volume.

* * * * *